US008956068B2

(12) United States Patent
Mekid et al.

(10) Patent No.: US 8,956,068 B2
(45) Date of Patent: Feb. 17, 2015

(54) KINEMATIC PLATFORM

(75) Inventors: Samir Mekid, Manchester (GB); Azfar Khalid, Islamabad (PK)

(73) Assignee: King Fahd University of Petroleum and Minerals, Dhahran (SA)

(*) Notice: Subject to any disclaimer, the term of this patent is extended or adjusted under 35 U.S.C. 154(b) by 731 days.

(21) Appl. No.: 12/985,186

(22) Filed: Jan. 5, 2011

(65) Prior Publication Data

US 2012/0168593 A1    Jul. 5, 2012

(51) Int. Cl.
F16C 11/00 (2006.01)
F16M 11/14 (2006.01)
F16M 11/04 (2006.01)
F16M 11/12 (2006.01)
F16M 11/18 (2006.01)

(52) U.S. Cl.
CPC ............. *F16M 11/14* (2013.01); *F16M 11/043* (2013.01); *F16M 11/121* (2013.01); *F16M 11/18* (2013.01)
USPC ........ 403/122; 403/127; 403/133; 248/176.1; 248/276.1; 74/490.03

(58) Field of Classification Search
USPC ........... 248/288.51, 188, 176.1, 176.3, 163.1, 248/121, 125.8, 125.9, 207, 276.1; 403/90, 403/122–144; 74/490.01, 490.02, 490.03, 74/490.04, 490.05; 188/156, 161, 166, 188/382
See application file for complete search history.

(56) References Cited

U.S. PATENT DOCUMENTS

| | | | |
|---|---|---|---|
| 4,211,456 A * | 7/1980 | Sears | 439/39 |
| 4,719,549 A * | 1/1988 | Apel | 362/398 |
| 4,739,241 A * | 4/1988 | Vachtsevanos et al. | 318/568.19 |
| 5,028,180 A | 7/1991 | Sheldon et al. | |
| 5,410,944 A | 5/1995 | Cushman | |
| 5,466,078 A * | 11/1995 | Szmanda et al. | 400/489 |
| 5,797,191 A | 8/1998 | Ziegert | |
| 5,857,238 A * | 1/1999 | Jmill | 15/256.5 |
| 6,217,249 B1 * | 4/2001 | Merlo | 403/90 |
| 6,336,375 B1 | 1/2002 | McMurtry et al. | |
| 6,350,076 B1 * | 2/2002 | Wagner et al. | 403/135 |
| 6,371,425 B2 | 4/2002 | Fidler | |
| 6,575,676 B2 | 6/2003 | Wang et al. | |
| 6,671,975 B2 | 1/2004 | Hennessey | |
| 6,722,842 B1 * | 4/2004 | Sawdon et al. | 414/729 |
| 6,772,619 B2 * | 8/2004 | Nashiki et al. | 73/1.79 |
| 7,036,233 B1 * | 5/2006 | Schindler | 33/1 PT |
| 7,040,033 B2 | 5/2006 | Zhu et al. | |
| 7,530,542 B2 * | 5/2009 | Boyce et al. | 248/371 |
| 7,841,799 B2 * | 11/2010 | Spratte et al. | 403/122 |
| 8,482,523 B2 * | 7/2013 | Didier et al. | 345/161 |
| 2004/0086351 A1 | 5/2004 | Kim et al. | |

(Continued)

*Primary Examiner* — Kimberly Wood
(74) *Attorney, Agent, or Firm* — Richard C Litman

(57) ABSTRACT

The kinematic platform is a spherical-prismatic-spherical kinematic platform providing six degrees of freedom with controlled braking at each joint. The kinematic platform includes a base and an upper platform plate, with the upper platform plate having opposed upper and lower surfaces. The upper surface thereof provides a mounting surface for an external article to which controlled three-dimensional movement is to be imparted. A plurality of linear actuators are further provided, with each linear actuator having opposed upper and lower ends. A plurality of upper and lower spherical joints are provided for pivotally mounting the linear actuators between the upper platform plate and a lower base. Each spherical joint provides selective and controllable braking, allowing for the controlled rotation of each end of each linear actuator with respect to the respective upper platform plate or base.

5 Claims, 9 Drawing Sheets

(56) References Cited

U.S. PATENT DOCUMENTS

| | | | |
|---|---|---|---|
| 2007/0060011 A1* | 3/2007 | Daftari et al. | 446/97 |
| 2007/0231061 A1 | 10/2007 | McMurtry | |
| 2008/0127501 A1* | 6/2008 | Eaton et al. | 33/503 |
| 2009/0145443 A1* | 6/2009 | Dreyfuss | 128/845 |
| 2010/0122602 A1 | 5/2010 | Marcroft et al. | |
| 2010/0310305 A1* | 12/2010 | Mekid | 403/104 |
| 2011/0194906 A1* | 8/2011 | Allen et al. | 409/201 |
| 2011/0247446 A1* | 10/2011 | Namoun et al. | 74/490.01 |
| 2012/0076570 A1* | 3/2012 | Mekid | 403/104 |

* cited by examiner

KINEMATIC PLATFORM

BACKGROUND OF THE INVENTION

1. Field of the Invention

The present invention relates to movable or adjustable platforms and to tripods, and particularly to a kinematic platform having three legs providing six degrees of freedom with controlled braking at each joint and high dexterity within the workspace.

2. Description of the Related Art

A need exists for simple and effective parallel kinematics mechanisms. Kinematics mechanisms are used in mechanical engineering applications for machining, robotics, positioning devices, coordinate measuring, fixtures, etc. Serial kinematics mechanisms are widely used and presently dominate the market. A serial kinematics mechanism has a series of cantilever beams that are movably connected together in an end-to-end fashion by prismatic, revolute or spherical joints, forming an open loop. The closer that a member is to a base of the mechanism within the serial structure, the higher the load on that member. Additionally, the farther that a member is from the base, the higher its deflection with respect to the base member. When a serial kinematics mechanism is subjected to loading, the position of the farthest member; i.e., the end-effector, is subject to the cumulative deflections of all serial members. Unfortunately, this results in large positioning errors at the end-effector. Being constructed of cantilevers, a serial mechanism has a poor stiffness to mass ratio, making such structures bulky in design with difficult in control of the joints.

Serial kinematics mechanisms allow fast and easy computation of the position of the end-effector given the position or state of all actuators. In general, this computation is known as the forward kinematics of a mechanism. However, determining the position or state of all actuators given the position of the end-effector, also known as the inverse kinematics, is very difficult. Particularly, control over rotation of the joints is of primary concern in serial kinematic platforms.

Numerous ball and socket joints having manual joint locking mechanisms exist. Such mechanisms are usually very complex and due to the manual locking are not suitable for robotic or parallel kinematic machine operations. Even lockable joint devices linked to hydraulic systems may not be suitable for robotic applications, or the like. Moreover, ball joints with detent stopping action do not lock to an arbitrarily desired position, and therefore are not precise enough for robotic machine applications. It would be very desirable to overcome the aforementioned problems caused by the use of existing ball joint mechanisms. Thus, a kinematic platform solving the aforementioned problems is desired.

SUMMARY OF THE INVENTION

The kinematic platform is a kinematic platform providing six degrees of freedom with controlled braking at each joint. The kinematic platform includes a base having opposed upper and lower surfaces, the lower surface being adapted for mounting on a support surface, such as a table or the like. An upper platform plate is provided, the upper platform plate having opposed upper and lower surfaces. The upper surface of the platform provides a mounting surface for an external article to which controlled three-dimensional movement is to be imparted.

A plurality of linear actuators are further provided, with each linear actuator having opposed upper and lower ends. Preferably, at least three such linear actuators are provided and, in the preferred embodiment, the linear actuators may be selectively actuated by an external controller. A plurality of upper spherical joints are respectively mounted to the lower surface of the upper platform plate so that the upper ends of the plurality of linear actuators are pivotally mounted to the upper platform plate. Similarly, a plurality of lower spherical joints are respectively mounted to the upper surface of the base so that the lower ends of the plurality of linear actuators are pivotally mounted to the base.

In one embodiment, each of the upper and lower spherical joints includes a joint housing having an open interior region and at least one open end for receiving at least one electromagnet. A spherical joint member formed from a ferromagnetic or paramagnetic material is positioned against the at least one electromagnet, and at least one cover member secures at least a portion of the spherical joint member within the joint housing so that the spherical joint member frictionally engages the at least one electromagnet. In use, the at least one electromagnet may be selectively and controllably actuated by the external controller to selectively control the degree of frictional engagement between the spherical joint member and the electromagnet to selectively control rotational freedom of the spherical joint member with respect to the at least one electromagnet and the joint housing.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
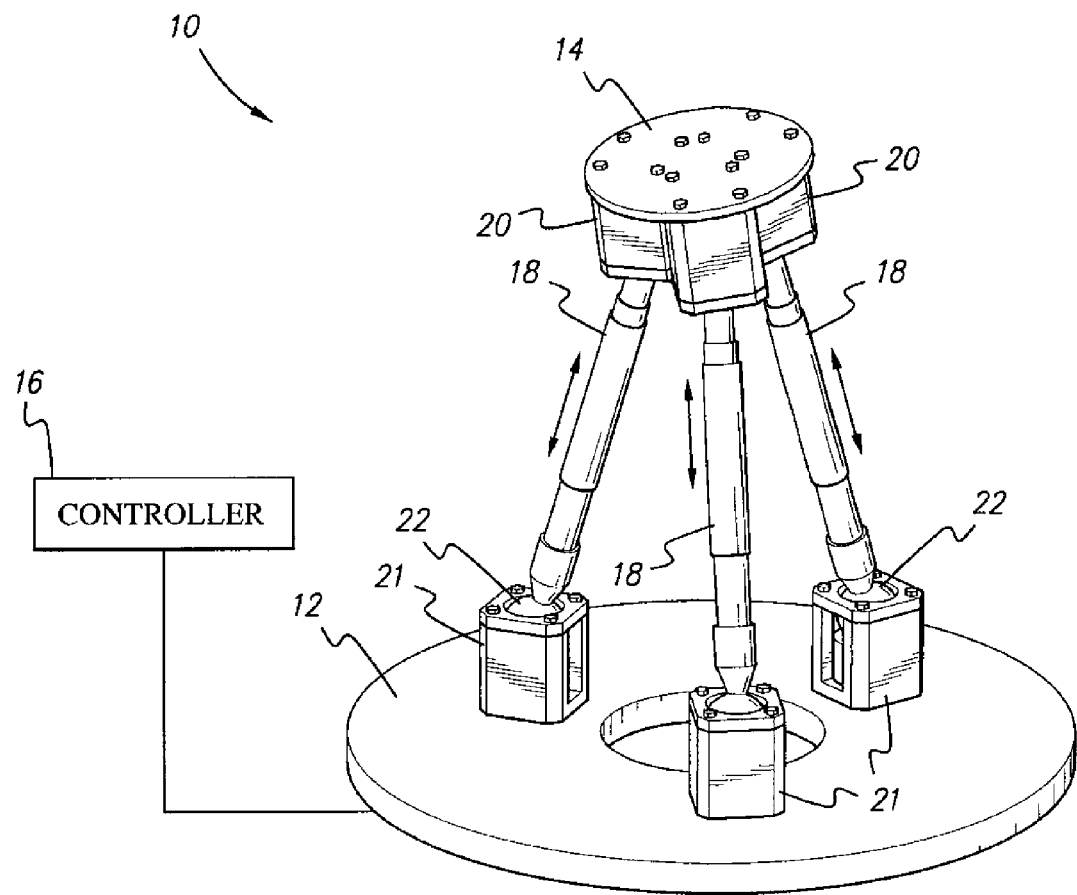
FIG. 1 is a perspective view of a kinematic platform according to the present invention.

As best shown in FIG. 1, the kinematic platform 10 is a kinematic platform providing six degrees of freedom with controlled braking at each joint. The kinematic platform 10 includes a base 12 having opposed upper and lower surfaces, the lower surface being adapted for mounting on a support surface, such as a table or the like. An upper platform plate 14 is further provided, with the upper platform plate 14 having opposed upper and lower surfaces. The upper surface of the platform 14 provides a mounting surface for an external article to which controlled three-dimensional movement is to be imparted.

A plurality of linear actuators 18 which may be actuated electrically, pneumatically, hydraulically, etc.) are further provided, each linear actuator 18 having opposed upper and lower ends. Preferably, at least three such linear actuators 18 are provided, and, in the preferred embodiment, the linear actuators 18 may be selectively actuated by an external controller 16. It should be understood that any suitable type of linear actuator may be utilized. Similarly, it should be understood that any suitable number of linear actuators 18 may be used. Although three such actuators 18 are shown in FIG. 1, it should be understood that the three actuators 18 are illustrated for exemplary purposes only. The controller 16 may be any suitable type of controller, such as a programmable logic controller, a proportional-integral-derivative (PID) controller, a computer or the like.

Figure 2:
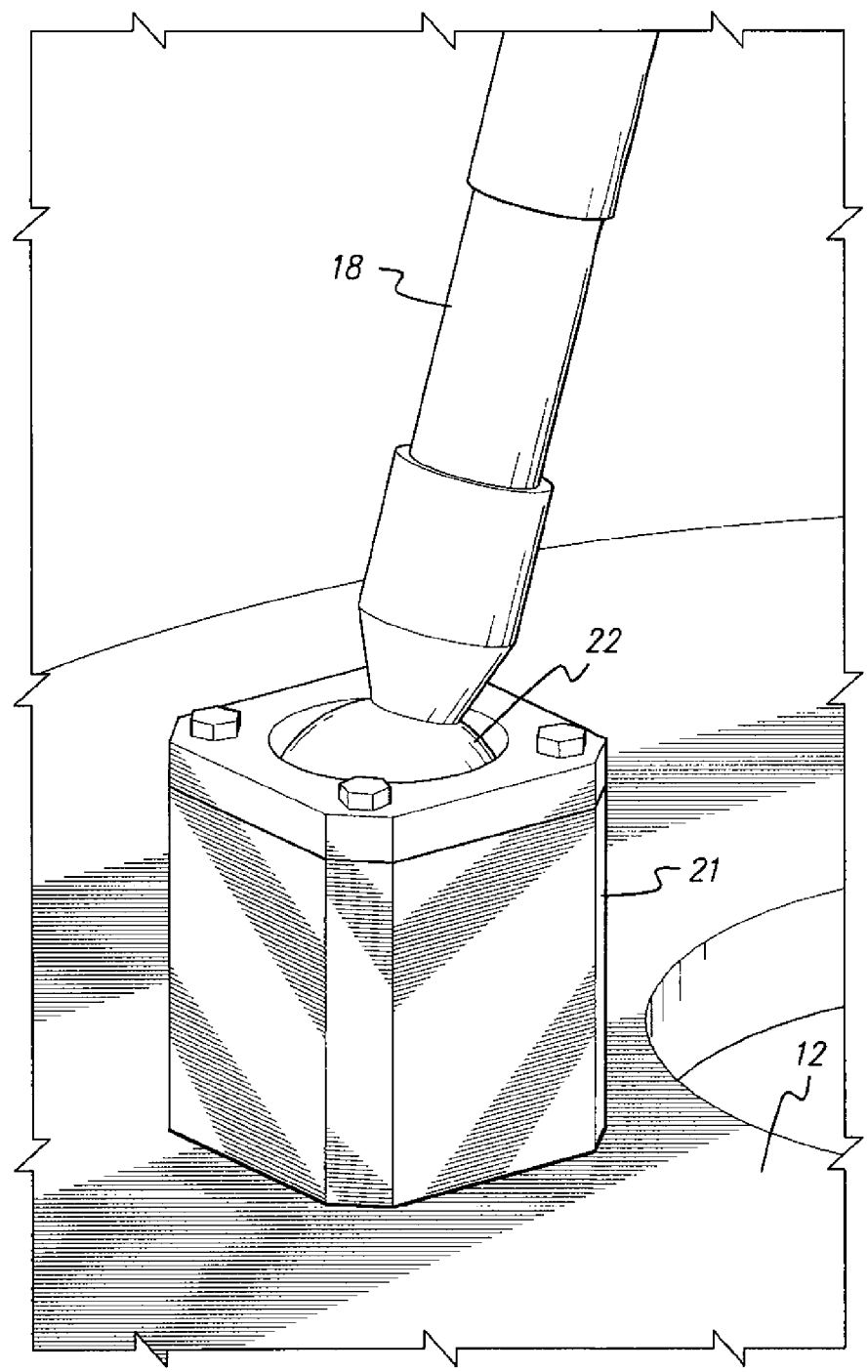
FIG. 2 is a partial perspective view of one leg of the kinematic platform according to the present invention, showing details of a spherical joint attaching the leg to the base.

A plurality of upper spherical joints 20 are respectively mounted to the lower surface of the upper platform plate 14 so that the upper ends of the plurality of linear actuators 18 are pivotally mounted to the upper platform plate 14. As best shown in FIG. 2, a plurality of lower spherical joints 21 are similarly mounted to the upper surface of the base 12 so that the lower ends of the plurality of linear actuators 18 are pivotally mounted to the base 12.

Figure 3:
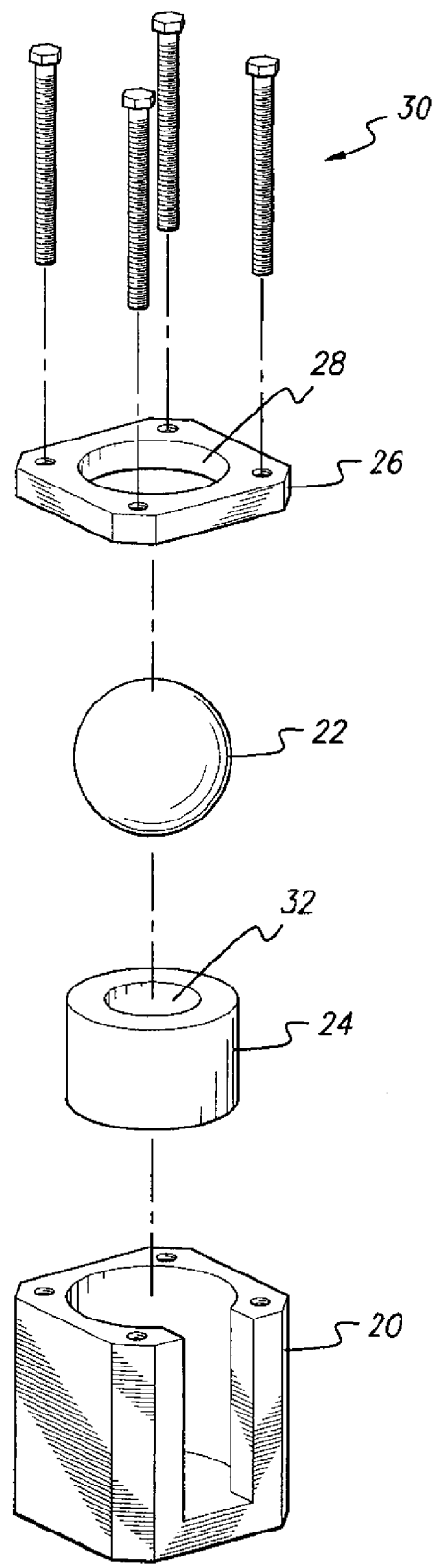
FIG. 3 is an exploded perspective view of a spherical joint of the kinematic platform according to the present invention.

The spherical joints have controllable braking to precisely position the platform 14 in the desired orientation. In a first embodiment, as illustrated in FIG. 3, each of the upper and lower spherical joints includes a joint housing 20 having an open interior region and at least one open end for receiving at least one electromagnet 24. It should be understood that any suitable type of electromagnet may be utilized. The electromagnet 24 is controlled and actuated by the external controller 16, which may be used to turn the electromagnet on and off, or to control the strength of magnetic attraction between the sphere and the electromagnet. Similarly, although a single electromagnet 24 is shown in FIG. 3, it should be understood that any desired number of electromagnets may be received within the housing 20.

A spherical joint member 22 formed from a ferromagnetic or paramagnetic material is positioned against the at least one electromagnet 24, and at least one cover member 26 secures at least a portion of the spherical joint member 22 within the joint housing 20 so that the spherical joint member 22 frictionally engages the at least one electromagnet 24. The cover member 26 may be secured to the open end of housing 20 by any suitable type of bolts 30, screws, pins or the like, which pass through apertures formed through the cover member 26. Preferably, the electromagnet 24 is of the coil type, the core having an open central passage 32 formed therethrough. The spherical joint member 22 is partially received within one open end of the central passage 32.

In use, the at least one electromagnet 24 may be selectively and controllably actuated by the external controller 16 to selectively control the degree of magnetic attraction between the spherical joint member 22 and the electromagnet 24 to selectively control rotational freedom of the spherical joint member 22 with respect to the at least one electromagnet 24 and the joint housing 20. Thus, through selective actuation of the linear actuators 18, the platform 14 is free to rotate with six degrees of freedom, the individual spherical joints 20, 21 having controllable braking. A portion of the spherical joint member 22 projects through a central aperture 28 formed through the cover member 26 (as shown in FIG. 2), one end of a respective linear actuator 18 being mounted to the sphere 22.

Figure 4:
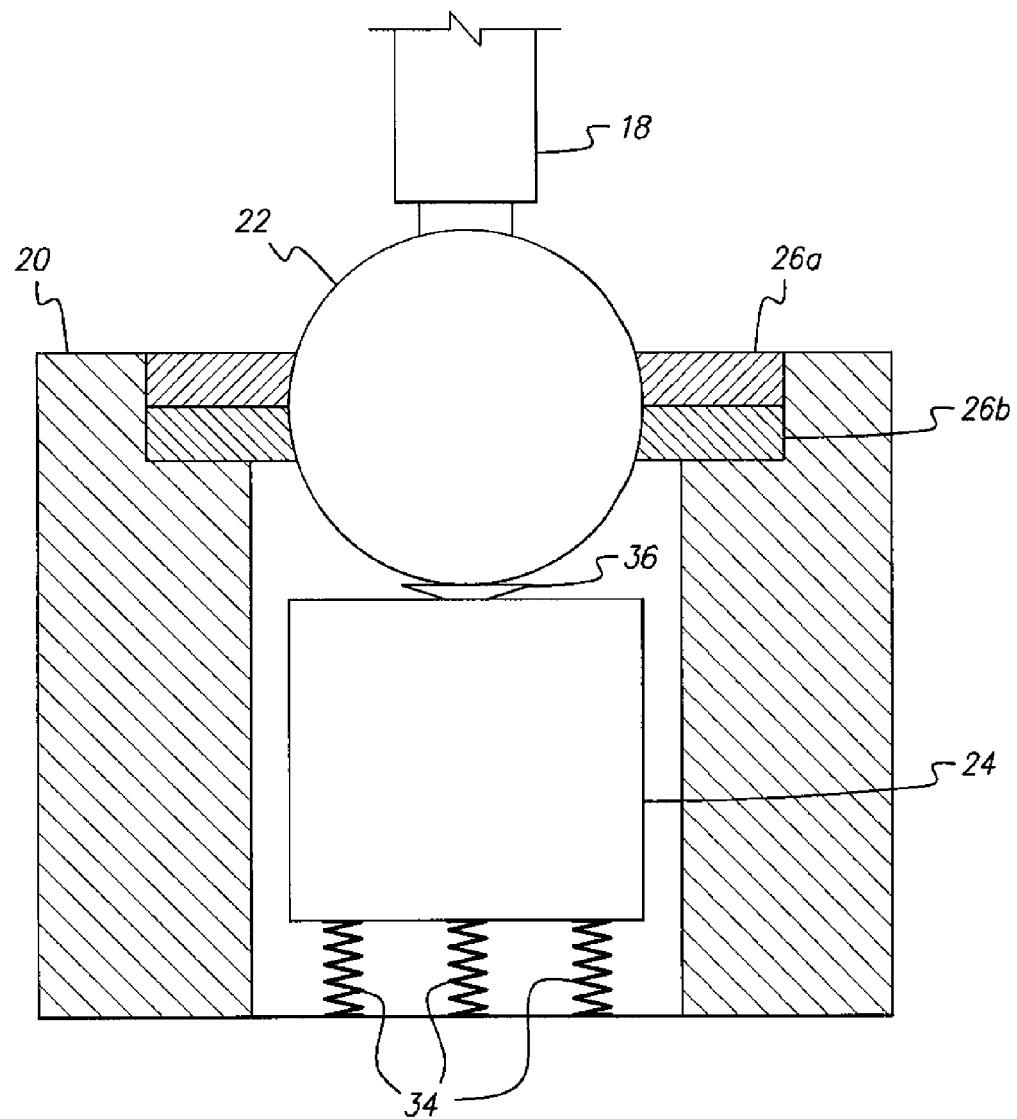
FIG. 4 is a side view in section of an alternative embodiment of a spherical joint for a kinematic platform according to the present invention.

In the alternative embodiment illustrated in FIG. 4, a cup 36 is mounted on the upper end of the electromagnet 24 for securely receiving a lower portion of the spherical joint member 22, thereby increasing surface contact between the sphere 22 and the electromagnet 24. Further, in the embodiment of FIG. 4, the single cover 26 of FIG. 3 is replaced by dual cover members 26a, 26b. It should be understood that any desired number of cover members may be used to securely position the spherical joint member 22 within the housing 20 and against the electromagnet 24. Further, at least one resilient member, such as springs 34, is positioned opposite the spherical joint member 22 to resiliently bias the electromagnet 24 against the spherical joint member 22.

Figure 5:
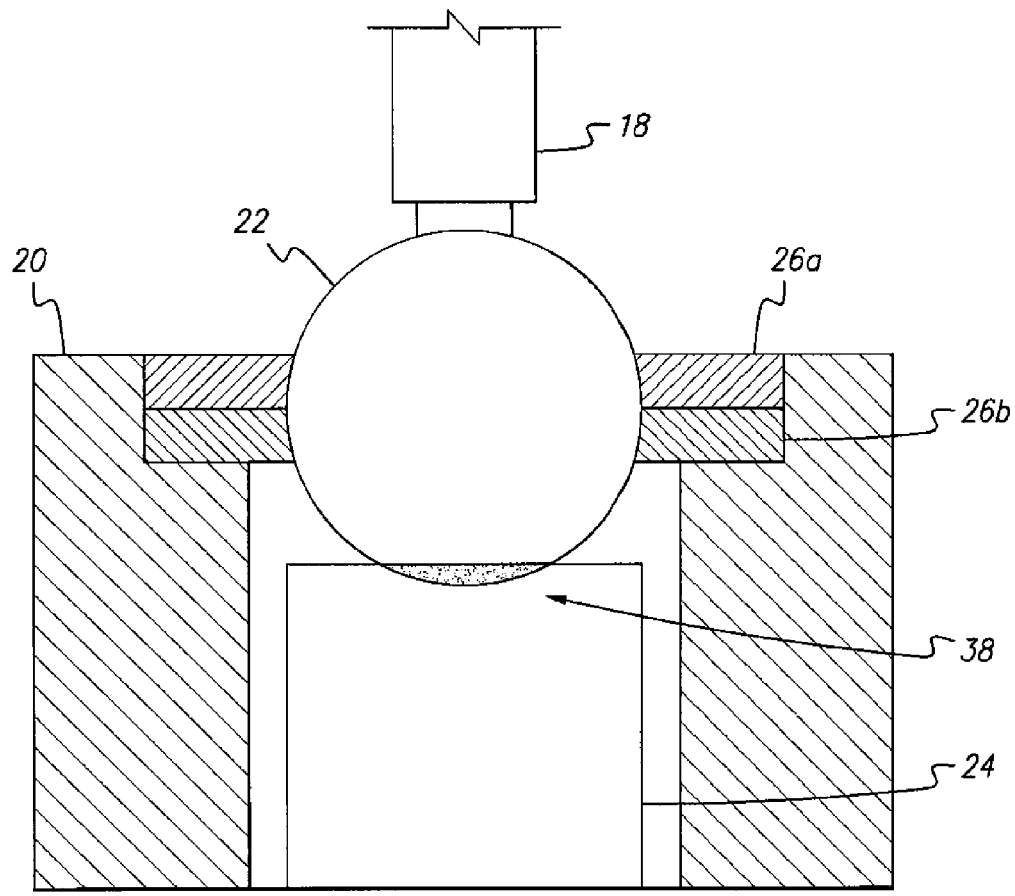
FIG. 5 is a side view in section of another alternative embodiment of a spherical joint for a kinematic platform according to the present invention.

Alternatively, as shown in FIG. 5, the cup 36 may be removed and a recess 38 may be formed in the proximal end of the electromagnet 24 for directly receiving the lower end of the spherical joint member 22. In FIGS. 4 and 5, firm contact between the cup 36 and the upper end of the electromagnet 24, or the recess 38, with the lower end of the spherical joint member 22 is desired, as the magnetic attraction therebetween (along with the frictional engagement between the spherical member 22 and the border defining aperture 28 of cover member 26) acts to selectively and controllably brake rotation of the spherical joint member 22 with respect to the housing 20. The frictional force is proportional to the force acting normal on the spherical joint member (i.e., the magnetic attraction between the electromagnet 24 and the spherical joint member 22), so controlling the magnitude of the magnetic force directly controls the frictional force therebetween.

Figure 6:
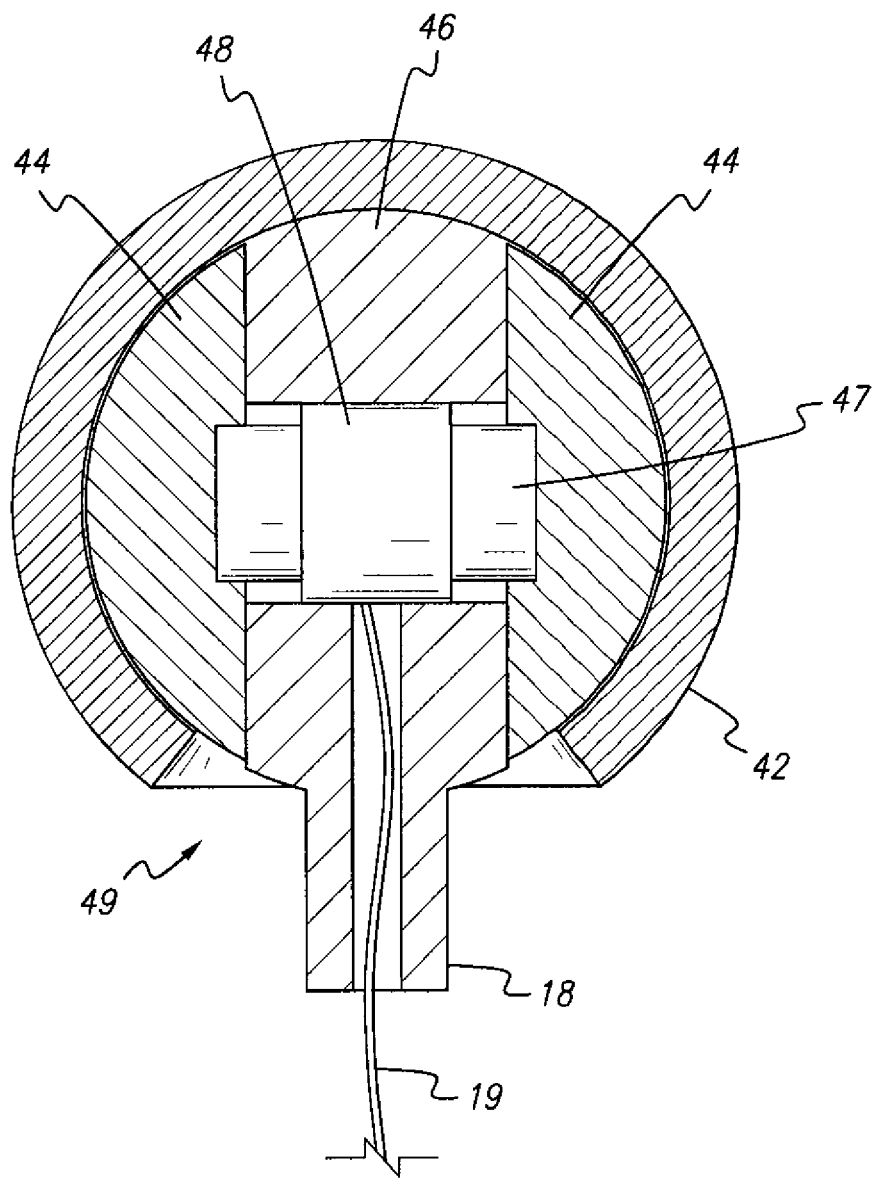
FIG. 6 is a side view in section of another alternative embodiment of a spherical joint for a kinematic platform according to the present invention.

In the alternative embodiment of FIG. 6, the spherical joints 20, 21 are replaced by a spherical joint 40 that may be mounted directly to the upper platform plate 14 or the base 12. The joint 40 includes an outer retainer shell 42, and provides relative spherical motion between the outer shell 42 and interior components 46 and 44. The spherical motion is limited by the size of the aperture 49 formed in the spherical shell 42, the maximum range of motion being achieved when the aperture size is equal to the circumference of the external spherical shell 42.

The internal portion of the spherical joint 40 includes peripheral spherical sections 44, which sandwich the central spherical section 46 to form an internal sphere inside of outer spherical shell 42 and in close proximity to an internal wall thereof. A solenoid, a piezoelectric actuator, an electromagnetic actuator 48 or the like is further provided, the actuator 48 having at least one piston 47 held by the central spherical section 46. In FIG. 6, a pair of pistons 47 are shown for pressing members 44 against the inner surface of shell 42, as will be described in detail below, although it should be understood that one of the members 44 may be fixed with respect to the shell 42 so that only a single piston 47 and a single movable member 44 may be used as an alternative. In the dual-piston arrangement of FIG. 6, the dual piston 47 has ends that are attached to the peripheral spherical sections 44.

Responsive to control signals received via a control line 19, which extends through a hollow portion of the linear actuator 18 (the adjacent end of which extends within the shell 42 through the aperture 49 and is mounted to the actuator 48), the actuator 48 causes outward radial mechanical displacement of the at least one piston 47. The mechanical displacement applies an outward radial force that pushes the peripheral sections 44 into frictional contact with the inner wall of the outer spherical shell 42, thereby braking rotational motion of the linear actuator 18. Braking and release control commands are delivered via the control line 19 from the controller 16.

Figure 7:
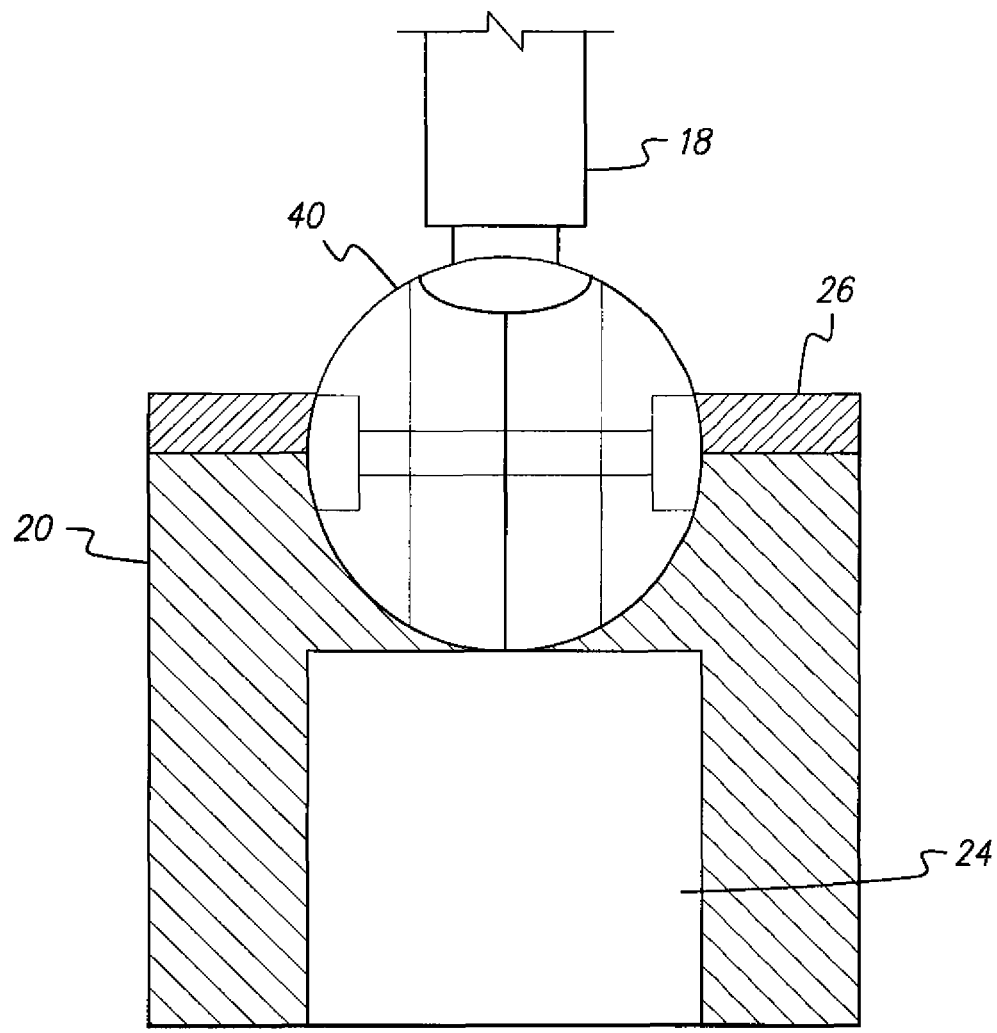
FIG. 7 is a side view in section of a further alternative embodiment of a spherical joint for a kinematic platform according to the present invention.

FIG. 7 illustrates an alternative embodiment in which the spherical joint 40 is used in place of spherical joint member 20 in the embodiment of FIG. 3. Thus, frictional engagement between the electromagnet 24 and the shell 42 of joint 40 may be used in combination with the internal braking of the movable piston of spherical joint 40, providing two separate controllable braking mechanisms. Similarly, as shown in FIG. 8, the spherical joint 40 may be used in combination with the embodiment of FIG. 5, the shell 42 rotating in the recess 38.

Figure 8:
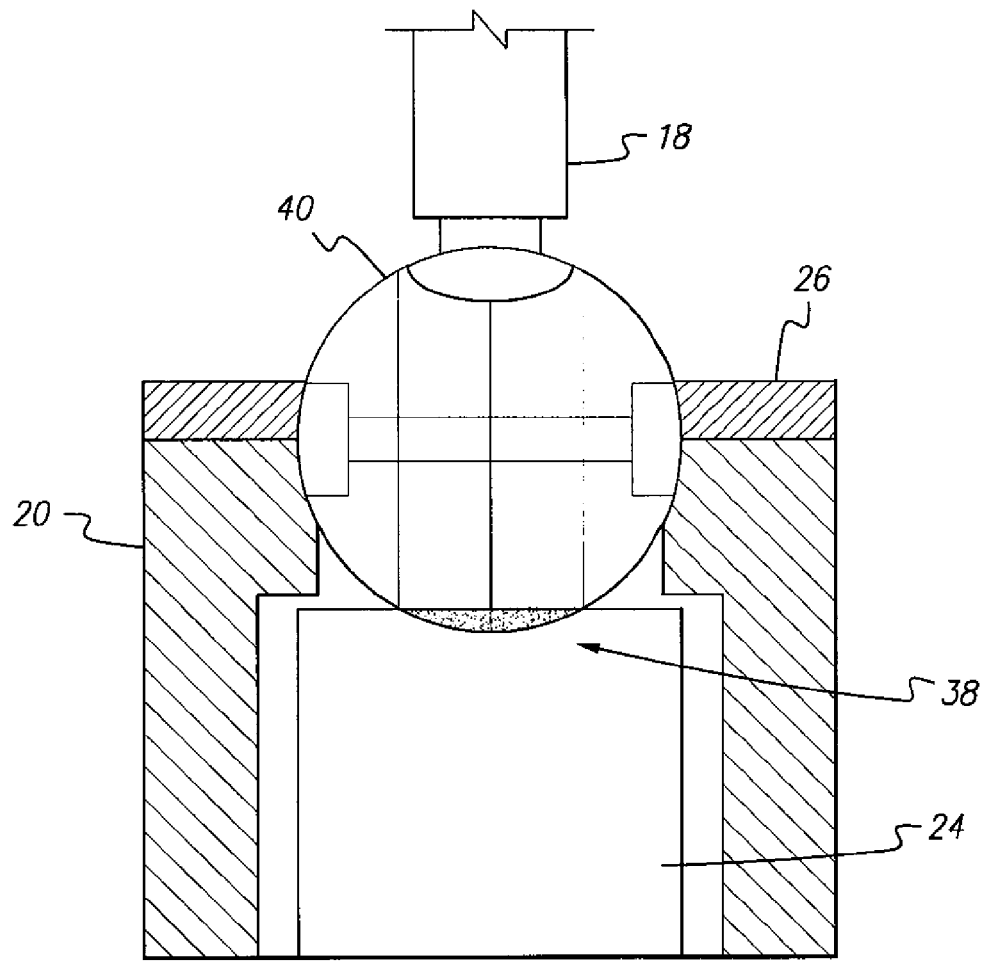
FIG. 8 is a side view in section of another alternative embodiment of a spherical joint for a kinematic platform according to the present invention.
Figure 9:
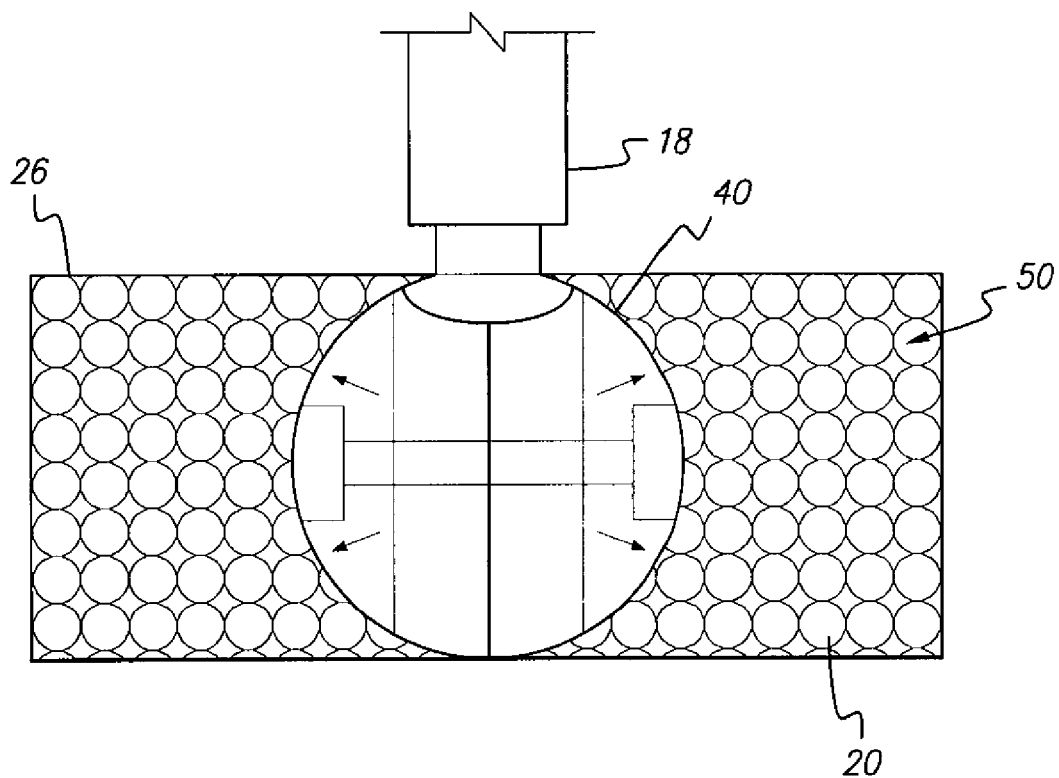
FIG. 9 is a side view of yet another alternative embodiment of a spherical joint for a kinematic platform according to the present invention.

In the further alternative embodiment of FIG. 9, the spherical joint member 40 is received within a housing 20, similar to those of FIGS. 7 and 8, but without an additional electromagnet 24. Instead, the remainder of the housing 20 is filled with frictionally engaging members, such as ball bearings 50, thus providing additional frictional engagement to the internal braking of the spherical joint member 40.

It is to be understood that the present invention is not limited to the embodiments described above, but encompasses any and all embodiments within the scope of the following claims.

We claim:

1. A kinematic platform, comprising:
    a base having opposed upper and lower surfaces, the lower surface being adapted for mounting on a support surface;
    an upper platform plate having opposed upper and lower surfaces;
    a plurality of linear actuators, each of the linear actuators having opposed upper and lower ends and being selectively actuatable;
    a plurality of upper spherical joints pivotally connecting the upper ends of the linear actuators to the lower surface of the upper platform plate;
    a plurality of lower spherical joints pivotally connecting the lower ends of the linear actuators to the upper surface of the base, each of the upper and lower spherical joints having:
        a joint housing having an open interior region and at least one open end;
        at least one electromagnet disposed within the open interior region of the joint housing;
        a spherical joint member positioned against the at least one electromagnet, the at least one electromagnet being external to said spherical joint member; and
        at least one cover member securing at least a portion of the spherical joint member within the joint housing so that the spherical joint member frictionally engages the at least one electromagnet, the at least one electromagnet being positioned opposite the at least one cover member, such that the at least a portion of the spherical joint member within the joint housing is positioned between the at least one electromagnet and the at least one cover member,
    wherein the at least one electromagnet is selectively actuatable to selectively control the degree of magnetic attraction between the spherical joint member and the electromagnet to selectively control rotational freedom of the spherical joint member with respect to the at least one electromagnet and the joint housing.

2. The kinematic platform as recited in claim 1, wherein the at least one electromagnet of each of said upper and lower spherical joints has a recess formed in one end thereof for receiving a portion of the spherical joint member.

3. The kinematic platform as recited in claim 2, wherein each said spherical joint member comprises:
    an outer spherical retaining shell having an outer wall and an internal wall, the retaining shell defining an aperture;
    at least one internal spherical sectioned member disposed inside the outer retaining shell, the at least one internal spherical sectioned member being in contact with the internal wall of the outer retaining shell;
    a spherical joint actuator having at least one piston, the at least one piston being secured to the at least one internal spherical sectioned member, the end of the respective linear actuator being mounted to the spherical joint actuator and extending through the shell aperture;
    a third internal spherical sectioned member attached to the spherical joint actuator; and
    means for relaying braking and release commands from a controller, the spherical joint actuator responsively varying friction between the at least one internal spherical sectioned member and the internal wall of the spherical retaining shell, thereby selectively braking and alternately allowing rotational motion of the at least one internal spherical sectioned member and the elongate member relative to the outer spherical retaining shell.

4. The kinematic platform as recited in claim 1, wherein the plurality of linear actuators consists of three linear actuators.

5. The kinematic platform as recited in claim 1, wherein the pluralities of upper and lower spherical joints respectively comprise at least three upper spherical joints and at least three lower spherical joints.

* * * * *